(12) United States Patent
Ratomski et al.

(10) Patent No.: US 6,902,614 B2
(45) Date of Patent: Jun. 7, 2005

(54) PERLITED PORTLAND CEMENT PLASTER JOINT COMPOUND ADDITIVE WITH LIME

(76) Inventors: Slawomir Ratomski, 3647 Broadway, Apt. GD, New York, NY (US) 10031; Valerie Rodriguez, 424 E. 52nd St., Apt. 7A, New York, NY (US) 10022; Vezen Wu, 248 W. 105th St., Apt. 3F, New York, NY (US) 10025

( * ) Notice: Subject to any disclaimer, the term of this patent is extended or adjusted under 35 U.S.C. 154(b) by 0 days.

(21) Appl. No.: 10/394,381

(22) Filed: Mar. 21, 2003

(65) Prior Publication Data

US 2004/0185173 A1 Sep. 23, 2004

(51) Int. Cl.$^7$ .......................... C04B 11/30; C04B 14/18
(52) U.S. Cl. ....................... 106/698; 106/675; 106/735; 106/772; 106/783; 106/784; 106/788; 106/816
(58) Field of Search ................................ 106/675, 698, 106/735, 772, 783, 784, 788, 816

(56) References Cited

U.S. PATENT DOCUMENTS

| | | | | |
|---|---|---|---|---|
| 2,820,714 | A | | 1/1958 | Schneiter et al. |
| 3,232,778 | A | * | 2/1966 | Dean .......................... 106/646 |
| 3,372,040 | A | * | 3/1968 | Ware ........................ 106/18.11 |
| 3,502,490 | A | * | 3/1970 | Ware .............................. 524/5 |
| 4,454,267 | A | | 6/1984 | Williams |
| 4,462,835 | A | | 7/1984 | Car |
| 5,352,288 | A | | 10/1994 | Mallow |
| 6,238,476 | B1 | * | 5/2001 | Sprinkle ...................... 106/772 |

FOREIGN PATENT DOCUMENTS

| JP | 8040758 | 2/1996 |
|---|---|---|

OTHER PUBLICATIONS

Derwent Abstract No. 1977–20689Y, abstract of Japanese Patent Specification No. 52–016525A (Feb. 1977).*
United States Gypsum Company, Material Safety Data Sheet, STRUCTO–LITE® Pre–Mixed Perlited Gypsum Plaste Oct. 1, 1999.
United States Gypsum Company, Material Safety Data Sheet, USG® White Moulding Plaster (AKA "Plaster of Paris"), Oct. 1, 1999.
United States Gypsum Company, Material Safety Data Sheet, Sheetrock® Brand All–Purpose Joint Compound—Total Ready–Mixed, Feb. 28, 2001.
United States Gypsum Company, Material Safety Data Sheet, SHEETROCK® Brand All–Purpose Joint Compound—Ready–Mixed, Oct. 1, 1999.
United States Gypsum Company, Material Safety Data Sheet, SHEETROCK® Brand Setting–Type Joint Compounds—Durabond® 20, Durabond® 45, Durabond® 90, Durabond® 210, Durabond® 300, Oct. 1, 1999.
United States Gypsum Company, Material Safety Data Sheet, SHEETROCK® Brand Lightweight Setting–Type Joint Compound (Easy Sand™), Ready–Mixed, Oct. 1, 1999.
Georgia Pacific, Material Safety Data Sheet, All Purpose Semi/Lightweight Ready Mix™ Joint Compounds, Dec. 6, 2000.
United States Gypsum Company, Material Safety Data Sheet, Sheetrock® Firecode® Compound, Mar. 27, 1998.
The Quikrite® Companies, Material Safety Data Sheet, Quikrite® Portland Cement Type I/II, Jan. 2002.
United States Gypsum Company, Material Safety Data Sheet, Hydrocal® B–11 Gypsum Cement, Oct. 1, 1999.
SILBRICO Corporation, Material Safety Data Sheet, Sil-Cell, Sodium Potassium Aluminum Silicate, Jan. 2, 1997.
SILBRICO Corporation, Material Safety Data Sheet, Ryolex®, Sodium Potassium Aluminum Silicate, Jan. 2, 1997.
SILBRICO Corporation, Material Safety Data Sheet, Sil–Kleer®, Sodium Potassium Aluminum Silicate, Jan. 2, 1997.
SILBRICO Corporation, Material Safety Data Sheet, Krum®, Sodium Potassium Aluminum Silicate, Jan. 2, 1997.
Cheney Lime & Cement Company, Material Safety Data Sheet, Hydrated Lime, Jul. 10, 2000.
Mikel and Company, Material Safety Data Sheet, Dr. Smooth Mud, Jan. 19, 2002.

* cited by examiner

*Primary Examiner*—Anthony J. Green
(74) *Attorney, Agent, or Firm*—Baker Botts LLP

(57) ABSTRACT

A composition and method for treating a surface is described. In one embodiment, the composition comprises about 10% to 90% by weight of cement, about 10% to 90% by weight of plaster, about 0.01% to about 20% by weight of lime, and about 0% to about 30% by weight of perlite. In another embodiment, the composition comprises plaster, cement, perlite, lime, joint compound and water, wherein the plaster, cement, perlite, and lime are in a ratio of about 10–90: 10–90: 0–30: 0.01–20 by weight. In another embodiment, the composition is prepared by a method comprising:
 (a) providing a first mixture comprising plaster, cement, perlite, and lime;
 (b) converting the first mixture to a second mixture by a method selected from the group consisting of stirring the first mixture, passing the first mixture through a strainer, and milling the first mixture; and
 (c) mixing the second mixture with joint compound and water to obtain the composition.

11 Claims, No Drawings

US 6,902,614 B2

PERLITED PORTLAND CEMENT PLASTER JOINT COMPOUND ADDITIVE WITH LIME

BACKGROUND OF THE INVENTION

1. Field of the Invention

The present invention is directed to a composition for treating a surface and to a method for preparing the composition.

2. Background Information

In the construction industry, joint compound is commonly used as a generic gap filler and a surface finisher for both construction and repair of surfaces. The joint compound has the advantage of being a versatile adhesive which can be used on a variety of surfaces. However, the joint compound suffers from lack of formability, durability, hardness, an uneven finish which necessitates sanding, and a tendency to crack. Furthermore, joint compound only serves at distinct and separate stages in the drywall installation and repair processes depending on the strength characteristics of joint compound. Several types of joint compounds may be necessary to completely fill the gaps of a surface and finish the surface. Sanding is also required. An all-purpose joint compound is typically useful only for a final coating because it does not possess the required hardness and workability due to its thinness and tendency to crack and streak when it contacts water. In practice, joint compound is usually modified by the use of additives, the most common of which is Plaster of Paris. However, even the joint compound/Plaster of Paris combination results in cracking, the need for numerous coatings, sanding and decreased time of workability due to quick drying time, generally only a few minutes. The sanding process typically requires a substantial amount of additional time and labor, and results in a dusty work site which requires additional time and labor to clean. Other construction materials also have disadvantages. For example, spackle lacks the durability or hardness necessary for large scale jobs. Generic plaster and concrete mixtures are generally heavy substances and therefore difficult and cumbersome to work with. Structo-Lite® produces an uneven finish, is not malleable, and requires sanding after application. Stucco, which is a mixture of plaster, sand and lime, lacks the hardness and smooth finish which are generally required.

Accordingly, there is a need in the art for a composition and method for treating a surface without the foregoing disadvantages. In particular there is a need in the art for a composition and method which avoid cracking, do not require sanding, have improved moldability, and increase the time of workability.

SUMMARY OF THE INVENTION

The foregoing problems are solved by the composition and method of the present invention. In one embodiment, the invention is directed to a composition comprising about 10% to 90% by weight of cement, about 10% to 90% by weight of plaster, about 0.01% to about 20% by weight of lime, and about 0% to about 30% by weight of perlite.

In another embodiment, the invention is directed to a composition comprising plaster, cement, perlite, lime, joint compound and water, wherein the plaster, cement, perlite, and lime are in a ratio of about 10–90: 10–90: 0–30: 0.01–20 by weight.

In another embodiment, the invention is directed to a composition prepared by a method comprising:

(a) providing a first mixture comprising plaster, cement, perlite, and lime; and (b) converting the first mixture to the composition by a method selected from the group consisting of stirring the first mixture, passing the first mixture through a strainer, and milling the first mixture.

In another embodiment, the invention is directed to a composition prepared by a method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture; and (c) mixing the second mixture with joint compound and water to obtain the composition.

In another embodiment, the invention is directed to a method for preparing a composition, the method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture; and (c) mixing the second mixture with joint compound and water to obtain the composition.

In another embodiment, the invention is directed to a method for treating a surface, the method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture;

(c) mixing the second mixture with joint compound and water to obtain a composition; and (d) applying a first coating of the composition to the surface, wherein the method does not comprise dry sanding the surface and does not comprise dry sanding the first coating.

The composition comprising plaster, cement, perlite, and lime is a dry, heterogeneous, fireproof, light-weight and non-hazardous mixture that may be used as an additive to joint compound to enhance and increase the strength, workability and surface flatness of joint compound. Its application with joint compound and water does not require dry sanding. The composition may include a dye to color the composition.

The composition is formulated especially for professional contractors, builders, wall/ceiling finishers and may also be used directly by end users, specialty drywall centers, distributors, hardware cooperatives, buying groups, home centers, mass merchandisers, architects, specifiers and building owners. The composition may be added to joint compound in fractional amounts for use in all stages of the wall/drywall/ceiling construction and repair process. It can be used on all surfaces including brick, drywall, and metal.

DETAILED DESCRIPTION OF THE INVENTION

As used herein, the term "surface" refers to a surface which may be made of a variety of materials. The surface may be, for example, the surface of a wall, a surface made of marble, a surface made of wood, a metal surface, a plastic surface, a Plaster of Paris surface, a plaster surface, a drywall surface, a surface made of concrete, or a surface made of stucco.

The terms "cement," "lime," "joint compound," and "perlite" are well known to one skilled in the art. For example, the term "cement" includes Portland cement, which may be any type of Portland cement. The term "lime" includes any combination of calcium oxide, calcium hydroxide or a mixture thereof with magnesium oxide, magnesium hydroxide or a mixture thereof. Exemplary lime sources include: Hydrated Lime; and Western Lime Corp: Lime STMC 206.

As used herein, the term "weight" as used in relation to a component of the compositions of the invention other than water refers to the dry weight of the component.

Several types of plasters, joint compounds, cements, sources of perlite and of lime, and optional other additives may be used in the invention. "Plaster" is intended to refer to any of several types of plasters. Exemplary plasters include: USG: Structo-lite®, a pre-mixed perlited gypsum plaster; and USG: White Moulding Plaster®, generally referred to as Plaster of Paris. Exemplary joint compounds include USG Sheetrock® Brand All-Purpose Joint Compound—Total Ready Mixed; USG Sheetrock® Brand All Purpose Joint Compound, Ready Mixed; USG Sheetrock® Brand Setting-Type Joint Compounds, such as DURABOND® 20, DURABOND® 45, DURABOND® 90, DURABOND® 210, DURABOND® 300; USG Sheetrock® Brand Lightweight Setting-Type Joint Compound (Easy Sand™), Ready Mixed; Georgia Pacific: All Purpose Semi/lightweight READY MIX™ Joint Compounds; and USG Sheetrock® FIRECODE® Compound. Exemplary cements include: Quikrete® Portland Cement Type I/II; and USG Hydrocal® B-11 Gypsum Cement.

The perlite used in the invention may be, for example, expanded perlite. The terms "expanded perlite" is well known to one skilled in the art. Expanded perlite is preferably expanded perlite of a fine grade with a majority of particles having a size between +200 mesh and −200 mesh. Performance improves with increasingly fine grades. Exemplary expanded perlite sources include: Silbrico "Sil-Cell", Silbrico "Ryolex®", Silbrico "Sil-Kleer®", and Silbrico "Krum®", in all of which the main component is Sodium Potassium Aluminum Silicate. Additives to the joint compound may also be used, such as, for example, Dr. Smooth Mud™: Wallboard/Joint Compound Additive/Tricopolymer Admix™.

As used herein, the term "Plaster of Paris" refers to any commercial preparation of pure gypsum plaster, or calcium sulfate hemihydrate, $CaSO_4.2H_2O$.

All components of the compositions of the invention are of industrial purity for masonry work.

Plaster, cement, perlite, lime, and optionally silica may be mixed in varying ratios, and the resulting mixture may be mixed in varying ratios with water and joint compound.

As an example, plaster, cement, perlite, and lime may be present in a ratio of about 57:37:3:3 by weight.

As an example, cement and Structo-Lite®, which contains Plaster of Paris and perlite in a ratio by weight of about 3:1, may be mixed in a ratio of about 1:2 to about 1:4 by weight.

As another example, cement, Structo-Lite® and lime may be present in a ratio of about 12:20:1 by weight.

As another example, the combined weight of plaster, cement, perlite, and lime comprises about 37–38% by weight of cement and about 3% by weight of lime.

As another example, the combined weight of plaster, cement, perlite, and lime comprises not more than about 15% by weight of perlite.

As another example, the combined weight of plaster, cement, perlite, and lime comprises a sum of the percentages by weight of plaster and perlite equal to about 59%.

As another example, the combined weight of plaster, cement, perlite, and lime comprises a percentage by weight of perlite which is selected from the group consisting of about 3%, about 6%, about 9%, about 12%, and about 15%.

As another example, the combined weight of plaster, cement, perlite, and lime comprises about 45%–59% by weight of plaster, about 37%–38% by weight of cement, about 0%–15% by weight of perlite, and about 3% by weight of lime.

As another example, the combined weight of plaster, cement, perlite, and lime comprises about 45% plaster, about 37% cement, about 15% perlite, and about 3% lime.

As another example, the combined weight of plaster, cement, perlite, and lime comprises about 59% plaster, about 37–38% cement, about 0–1% perlite, and about 3% lime.

As another example, the combined weight of plaster, cement, perlite, and lime comprises a sum of the percentages by weight of plaster and perlite equal to 60%.

As another example, the combined weight of plaster, cement, perlite, and lime comprises an amount of perlite which may range from about 3% to about 7% by weight and may be, for example, about 3% by weight.

Several examples of the composition comprising Plaster of Paris, cement, perlite, and lime are also shown in Table 1, where the proportions for each component vary (Samples A–I), and in Table 2, where the proportions of cement and lime are fixed in the ratio of 37:3 (Samples J–R). All percentage values in Tables 1 and 2 refer to percentages by weight.

Relevant properties of composition comprising Plaster of Paris, cement, perlite, lime, joint compound and water may be assigned five possible values: "U"—Unacceptable, "P"—Poor, "N"—Neutral, "G"—Good, "E"—Excellent. Table 3 shows the values of the properties for several examples of mixtures of Plaster of Paris, cement, perlite, lime, joint compound and water (Samples A–I), in which the relative percentages by weight of Plaster of Paris, cement, perlite, and lime are the same as in Samples A–I in Table 1, respectively. Native joint compound has an "N" value for each of the properties.

TABLE 1

| | Sample ID | | | | | | | | |
|---|---|---|---|---|---|---|---|---|---|
| | A | B | C | D | E | F | G | H | I |
| Cement | 27.0% | 30.0% | 37.0% | 38.0% | 38.0% | 38.0% | 38.0% | 38.9% | 47.0% |
| Plaster | 52.5% | 45.0% | 45.0% | 0.0% | 34.0% | 44.0% | 59.0% | 43.7% | 37.5% |
| Perlite | 17.5% | 15.0% | 15.0% | 59.0% | 25.0% | 15.0% | 0.0% | 14.8% | 12.5% |
| Lime | 3.0% | 10.0% | 3.0% | 3.0% | 3.0% | 3.0% | 3.0% | 2.6% | 3.0% |
| Total | 100.0% | 100.0% | 100.0% | 100.0% | 100.0% | 100.0% | 100.0% | 100.0% | 100.0% |

TABLE 2

| | Sample ID | | | | | | | | |
|---|---|---|---|---|---|---|---|---|---|
| | J | K | L | M | N | O | P | Q | R |
| Cement | 37.0% | 37.0% | 37.0% | 37.0% | 37.0% | 37.0% | 37.0% | 37.0% | 37.0% |
| Plaster | 45.0% | 47.0% | 49.0% | 51.0% | 53.0% | 55.0% | 57.0% | 59.0% | 60.0% |
| Perlite | 15.0% | 13.0% | 11.0% | 9.0% | 7.0% | 5.0% | 3.0% | 1.0% | 0.0% |
| Lime | 3.0% | 3.0% | 3.0% | 3.0% | 3.0% | 3.0% | 3.0% | 3.0% | 3.0% |
| Total | 100.0% | 100.0% | 100.0% | 100.0% | 100.0% | 100.0% | 100.0% | 100.0% | 100.0% |

TABLE 3

| | Sample ID | | | | | | | | |
|---|---|---|---|---|---|---|---|---|---|
| | A | B | C | D | E | F | G | H | I |
| Adhesion | G | G | E | G | E | G | E | G | E |
| Consistency | G | G | E | N | E | G | E | G | E |
| Moldability | G | G | E | N | G | G | E | E | E |
| Wet Sanding | G | E | E | P | G | G | G | G | E |
| Drying Time | G | E | E | G | G | G | E | G | G |
| Cracking | G | E | E | N | G | N | E | G | G |
| Dried Hardness | N | G | E | G | G | N | E | G | G |
| Dried Smoothness | N | G | E | G | N | N | E | G | N |
| Dried Color | G | G | G | G | G | N | G | G | G |
| Fireproof | G | G | E | G | G | N | E | G | G |

The composition comprising plaster, cement, perlite, and lime may optionally comprise silica. As an example, the composition comprises about 1% of silica by weight. As another example, the amount of silica is not more than 5% by weight.

The composition comprising plaster, cement, perlite, lime, joint compound, water, may optionally comprise silica. As an example, the silica is present in about 1% of silica of the combined weight of plaster, cement, perlite, and lime. As another example, the amount of silica is not more than 5% by weight of the combined weight of plaster, cement, perlite, lime, and silica.

As another example, the composition comprises plaster, cement, perlite, lime and silica in a ratio of about 53:20:22:4:1 by weight.

As another example, in the composition comprising plaster, cement, perlite lime, joint compound and water, the joint compound, water, cement and Structo-Lite® may be present in a ratio of about 16:1:0.6:2.4–16:1:0.1:0.4 by volume.

The composition comprising plaster, cement, perlite, and lime may be made by the following procedure. Plaster, cement, perlite, lime, are mixed thoroughly to from the first mixture. The plaster, cement, perlite, and lime may be mixed in any order. The first mixture is then converted to the composition. Converting the first mixture may be accomplished by stirring the first mixture, passing the first mixture through a strainer, of milling the first mixture. A preferred strainer is a strainer which allows particles of less than 1000 microns to pass through the strainer. The resulting composition has substantially all particles which have a size less than 1000 microns. As an example, the strainer may be a strainer that allows particles of less than 300 microns to pass through the strainer. The resulting composition has substantially all particles which have a size less than 300 microns. As another example, the strainer may be a strainer that allows particles which have a size of about 50 to about 100 microns to pass through the strainer. The resulting composition has substantially all particles which have a size of about 50 to about 100 microns. As another example, the first mixture may be milled to form a composition having substantially all particles which have a size less than 1000 microns. As another example, the first mixture may be milled to form a composition having substantially all particles which have a size less than 300 microns, such as a composition having substantially all particles which have a size of about 50 to about 100 microns. As another example, the first mixture may be stirred to form a composition having substantially all particles which have a size less than 1000 microns. As another example, the first mixture may be stirred to form a composition having substantially all particles which have a size less than 300 microns, such as a composition having substantially all particles which have a size of about 50 to about 100 microns. The time of mixing or stirring of the first mixture is a time sufficient to achieve a substantially even distribution of the components plaster, cement, perlite, and lime.

Passing the mixture comprising plaster, cement, perlite, and lime through a strainer may include, for example, sifting the mixture through the strainer. The strainer may be a strainer having a mesh size such that the strainer allows particles of less than 1000 microns to pass through the strainer. Particles larger than 1000 microns are substantially removed from the mixture. Without wishing to be bound by any theory or mechanism, it is believed that at least some cement particles which are smaller than the mesh size are also removed by adhering to larger particles, such as, for example, perlite particles which are being removed by the strainer. The residue left on the strainer may be used as an additive to the composition comprising plaster, cement, perlite, and lime. This additive and optionally cement may be added to the composition when large, heavy grade holes are required to be filled and when the coating of the composition does not need to be smooth.

The composition comprising plaster, cement, perlite, and lime is preferably made in an environment with less than 50% humidity. A similar procedure may be followed to make the composition also comprising silica.

The joint compound may be any type of joint compound used in the construction industry, such as, for example, all purpose joint compound or light joint compound. After making the composition comprising plaster, cement, perlite, and lime, the composition is added to the joint compound. Water is added to the mixture of the composition and joint compound. Alternatively, after making the composition, the composition may be mixed with joint compound and water. The resulting composition is a composition comprising plaster, cement, perlite, lime, joint compound and water. This composition may optionally contain silica. The composition comprising plaster, cement, perlite, lime, joint compound and water may be used for treating a surface. For example, the composition comprising plaster, cement, perlite, lime, joint compound and water may be used for filling gaps in a surface and finishing the surface. The composition may be used as a first coating on a surface, for example, to embed a tape, mesh, corner bead, covering joints, and fasteners, as a first coating and a second filler coating, or as a first coating, second coating, and third and final coating.

Without being bound by any theory or mechanism, it is believed that plaster, cement, perlite, and lime serve the following functions. Plaster provides moldability and density to joint compound. Perlite enhances the fireproofing capability, supports high temperature insulation, provides light-weight characteristics to the composition, and improves the consistency and enhances the brightness of the composition. The cement, which may be, for example, Portland cement Type I or II, provides hardness and density to the composition. Portland cement also imparts smoothness to the dried surface of the composition when used in admixture with joint compound. Lime provides a sticky consistency to the composition, which allows the composition to be moved and handled without spills, and prevents cracking. Silica, which is optionally present, slows the drying of the composition and alters the texture of the dried surface of the composition. In one exemplary embodiment of the invention, the composition comprises silica which is crystalline silica.

The composition comprising plaster, cement, perlite, lime, joint compound and water may be used for treating a surface. For example, the composition may be used for filling gaps in a surface and finishing the surface. The composition has several advantages. The composition is fireproof, may be applied quickly and easily and is easy to work with and handle. The application of the composition generally does not result in streaking, cracking, bleeding, or water marks. Once applied, the composition sets rapidly. The drying time of the composition is longer than for joint compound or Structo-Lite®Significantly, the labor time required to complete an application of the composition can be 50% shorter than for joint compound or Structo-Lite®.

The composition is water resistant and usable on most any surface. Advantageously, no sealer coating is required when applying the composition to a concrete surface. The composition is inexpensive, possesses high strength and hardness, and is usable at all stages of the treatment of the surface, including repair and installation.

Advantageously, the method of the invention for treating a surface does not require dry sanding. Thus, after application of a coating of the composition comprising plaster, cement, perlite, lime, joint compound and water, the coating may be smoothed and shaped without any dry sanding being performed. For example, the coating may be smoothed and shaped with a wet acrylic sponge. Alternatively, if dry sanding is desired, significantly less dry sanding is required as compared to coatings in the prior art.

The composition comprising plaster, cement, perlite, lime, and optionally silica may also comprise various types of industrial dyes, such as rhodamine, which change the color of the composition. In the alternative, the industrial dyes may be added to the composition comprising plaster, cement, perlite, lime, joint compound, water, and optionally silica to change the color of the composition. Particles of the dyes of varying sizes may be added to the compositions to change the texture of the compositions.

The invention may be further described by the following example:

EXAMPLE 1

A surface was treated by applying three successive coatings according to the following procedure:

A first coating was applied to fill large holes or gaps. The composition used for the first coating was made by mixing 3 cups of a dry mixture comprising Plaster of Paris, cement, expanded perlite, and lime, 1 gallon, or 16 cups, of joint compound and 1 cup water.

1 hour after applying the first coating to the surface, a second coating was applied to the first coating. The composition used for the second coating was made by mixing one cup of a dry mixture comprising Plaster of Paris, cement, expanded perlite and lime, 1 gallon, or 16 cups, of joint compound and 1 cup of water. The first and second coatings were applied in one day.

A third coating was then applied to the second coating. The composition used for the third coating was made by mixing ½ cup of a dry mixture comprising Plaster of Paris, cement, expanded perlite, and lime, 1 gallon, or 16 cups, of joint compound and 1 cup of water. The coating was smoothed with a wet sponge without dry sanding.

It should be understood that various changes and modifications to the examplary embodiments described herein will be apparent to those skilled in the art. Such changes and modifications can be made without departing from the spirit and scope of this invention, the scope being defined by the appended claims.

We claim:

1. A composition comprising plaster, cement, perlite, lime, joint compound and water, wherein the plaster, cement, perlite, and lime are in a ratio of about 10-90:10–90 0–30:0.01–20 by weight.

2. The composition of claim 1, wherein the volume of the joint compound, the volume of the water, and the combined volume of the plaster, cement, perlite, and lime are in a ratio of about 16:1:3.

3. A composition prepared by a method comprising:
(a) providing a first mixture comprising plaster, cement, perlite, and lime;
(b) converting the first mixture to a second mixture by a method selected from the group consisting of stirring the first mixture passing the first mixture through a strainer, and milling the first mixture wherein the particle size of said plaster, cement, perlite and lime in said second mixture is 300 microns or less; and (c) mixing the second mixture with joint compound and water to obtain the composition, wherein the first mixture is converted to the second mixture by milling the first mixture to form a second mixture having substantially all particles which have a size of 100 microns or less.

4. A composition prepared by a method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture wherein the particle size of said plaster, cement, perlite and lime in said second mixture is 300 microns or less; and (c) mixing the second mixture with joint compound and water to obtain the composition, wherein the second mixture, the joint compound and the water are in a ratio by volume of about 3:16:1.

5. A composition prepared by a method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture wherein the particle size of said plaster, cement, perlite and lime in said second mixture is 300 microns or less; and (c) mixing the second mixture with joint compound and water to obtain the composition wherein the first mixture is converted to the second mixture by passing the first mixture through a strainer, wherein the strainer is a strainer that allows particles of 300 microns or less to pass through the strainer.

6. A method for preparing a composition, the method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture such that the plaster, cement, perlite and lime has a particle size of 300 microns or less; and (c) mixing the second mixture with joint compound and water to obtain the composition, wherein the first mixture is converted to the second mixture by milling the first mixture to form a second mixture having substantially all particles which have a size of 100 microns or less.

7. A method for preparing a composition, the method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture such that the plaster, cement, perlite and lime has a particle size of 300 microns or less; and (c) mixing the second mixture with joint compound and water to obtain the composition, wherein the second mixture, the joint compound and the water are in a ratio by volume of about 3:16:1.

8. A method for preparing a composition, the method comprising:

(a) providing a first mixture comprising plaster, cement, perlite, and lime;

(b) converting the first mixture to a second mixture by a method selected from the group consisting of stirring the first mixture, passing the first mixture through a strainer, and milling the first mixture such that the plaster, cement, perlite and lime has a particle size of 300 microns or less; and (c) mixing the second mixture with joint compound and water to obtain the composition, wherein the first mixture is converted to the second mixture by passing the first mixture through a strainer, wherein the strainer is a strainer that allows particles of 100 microns or less to pass through the strainer.

9. A composition comprising plaster, cement, perlite, lime, joint compound and water, wherein the plaster, cement, perlite, and lime are in a ratio of about 10–90:10–90:0–30:0.01–20 by weight, wherein the particle size of said cement, plaster, lime and perlite is 300 microns or less.

10. The composition of claim 9, wherein the particle size of said cement, plaster, lime and perlite is 100 microns or less.

11. The composition of claim 10, wherein the particle size of said cement, plaster, lime and perlite is 50 microns or less.

* * * * *

UNITED STATES PATENT AND TRADEMARK OFFICE
CERTIFICATE OF CORRECTION

PATENT NO. : 6,902,614 B2
DATED : June 7, 2005
INVENTOR(S) : Ratomski et al.

It is certified that error appears in the above-identified patent and that said Letters Patent is hereby corrected as shown below:

Title page,
Item [76], Inventors,
"Slawomir Ratomski 3647 Broadway, Apt. GD, New York, NY 10031;
Valerie Rodriguez 424 E. 52nd St., Apt. 7A, New York, NY 10022);
Vezen Wu 248 W. 105th St., Apt. 3F, New York, NY 10025;" should read
-- Slawomir Ratomski 3647 Broadway, Apt. GD, New York, NY 10031;
Valerie Rodriguez 42 Woodland Avenue, Bronxville, NY 10708;
Vezen Wu 350 East Ashley Street, Jacksonville, FL 32202 --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,902,614 B2
APPLICATION NO. : 10/394381
DATED : June 7, 2005
INVENTOR(S) : Ratomski et al.

It is certified that error appears in the above-identified patent and that said Letters Patent is hereby corrected as shown below:

Column 7, line 61: "Structo-Lite®Significantly" should read
-- Structo-Lite®.  Significantly --

Column 8, line 48: "examplary" should read -- exemplary --

Column 8, line 56 (claim 1, with colon between 90, 0):
"10-90:10-90 0-30:0.01-20" should read -- 10-90:10-90:0-30:0.01-20 --

Column 9, line 1 (claim 3):  "mixture passing" should read
-- mixture, passing --

Column 9, line 36 (claim 5): "composition wherein" should read
-- composition, wherein --

Signed and Sealed this

Twenty-second Day of August, 2006

JON W. DUDAS
*Director of the United States Patent and Trademark Office*